United States Patent [19]

Schwee

[11] 3,868,659

[45] Feb. 25, 1975

[54] SERIAL ACCESS MEMORY USING THIN MAGNETIC FILMS

[75] Inventor: Leonard J. Schwee, Colesville, Md.

[73] Assignee: The United States of America as represented by the Secretary of the Navy, Washington, D.C.

[22] Filed: Apr. 10, 1973

[21] Appl. No.: 349,871

[52] U.S. Cl. ...................... 340/174 TF, 340/174 YC
[51] Int. Cl. ........................ G11c 11/14, G11c 11/42
[58] Field of Search ................ 340/174 TF, 174 MS

[56] References Cited

UNITED STATES PATENTS

| | | | |
|---|---|---|---|
| 3,129,412 | 4/1964 | Lovell | 340/174 MS |
| 3,138,789 | 6/1964 | Push | 340/174 MS |

OTHER PUBLICATIONS

Bell System Technical Journal, July–Aug. 1972, pg. 1427 to 1430.

Bell System Technical Journal, July–Aug. 1972, pg, 1440–1444.

*Primary Examiner*—James W. Moffitt
*Attorney, Agent, or Firm*—R. S. Sciascia; J. A. Cooke; S. Sheinbein

[57] ABSTRACT

A serial access memory based on the propagation of cross-tie walls and Bloch lines along domain walls in thin magnetic films. Domain walls are placed on a Permalloy film on the order of 300 A thickness. Cross tie walls, Bloch lines, and inverted Neel walls are introduced into the domain walls to store the binary information. Variation of the current through conductors placed above the domain wall changes the fields along the walls causing the relocation of Bloch lines and cross ties in the wall which causes propagation of the information contained in the inverted Neel wall section along the wall.

6 Claims, 11 Drawing Figures

SERIAL ACCESS MEMORY USING THIN MAGNETIC FILMS

BACKGROUND OF THE INVENTION

This invention relates to magnetic domain wall propagation arrangements and, more particularly to a serial access memory device based on the propagation of cross-ties and Bloch lines along domain walls in thin magnetic films.

Prior art devices for recording and storing binary information include tape recorders, disks, shift registers and bubble devices. The first two devices are slow due to the mechanical means required. Shift registers are only practical for small capacity storage. Bubble propagation devices require domain wall motion and the speed of propagation is limited to about 100 kilobits/-second.

BRIEF SUMMARY OF THE INVENTION

Accordingly, this invention provides a polycrystalline serial access memory wherein the recording and pickup heads remain stationary as does the film and the data alone moves. Domain walls are placed on the film by applying currents through wires over the film. Digital information is read into the memory by placing a fine wire above and parallel to the domain wall and applying a current pulse of proper polarity to invert the Neel wall. The digital information stored in the wall is moved along it by varying the field produced by conductors placed above the domain wall, propagating the Bloch lines and cross-ties along the wall.

OBJECTS OF THE INVENTION

It is therefore an object of the present invention to provide an inexpensive and compact memory device.

Another object of the present invention is to provide a magnetic serial access memory device having no moving parts.

Yet another object of the present invention is to provide a nonvolatile memory device.

Still another object of the present invention is to store information in domain walls rather than in domains.

A further object of the present invention is to provide an extremely fast propagation system in a memory device.

Yet another object of the present invention is to provide a polycrystalline serial access memory device.

Still another object of the present invention to provide a digital storage system in which binary digits are represented by inverted Neel walls, Bloch lines and cross-ties on domain walls.

Yet another object of the present invention is to provide a stable memory device wherein inverted Neel walls segments instead of bubbles are stored in the device.

A still further object of the present invention is to propagate Bloch lines and cross-tie walls along a domain wall.

BRIEF DESCRIPTION OF THE DRAWINGS

Still other objects, advantages and features will become apparent to those of ordinary skill in the art by reference to the following detailed descriptions of a preferred embodiment of the apparatus and the appended claims. The various features of the exemplary embodiments according to the invention may be best understood with reference to the accompanying drawings, wherein:

DESCRIPTION OF THE PREFERRED EMBODIMENT

Figure 1A:
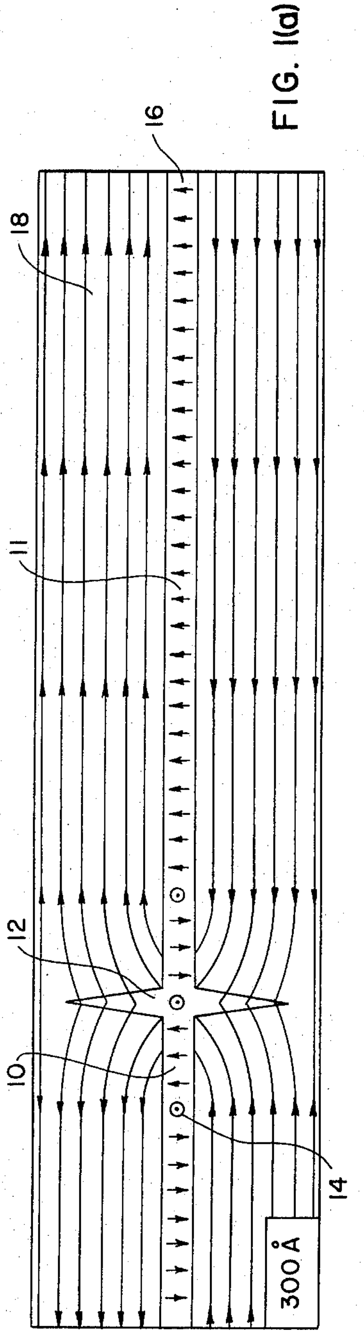
FIGS. 1 *a*, 1 *b* and 1 *c* illustrates a schematic view of the various types of walls found in thin Permalloy films.
Figure 1B:
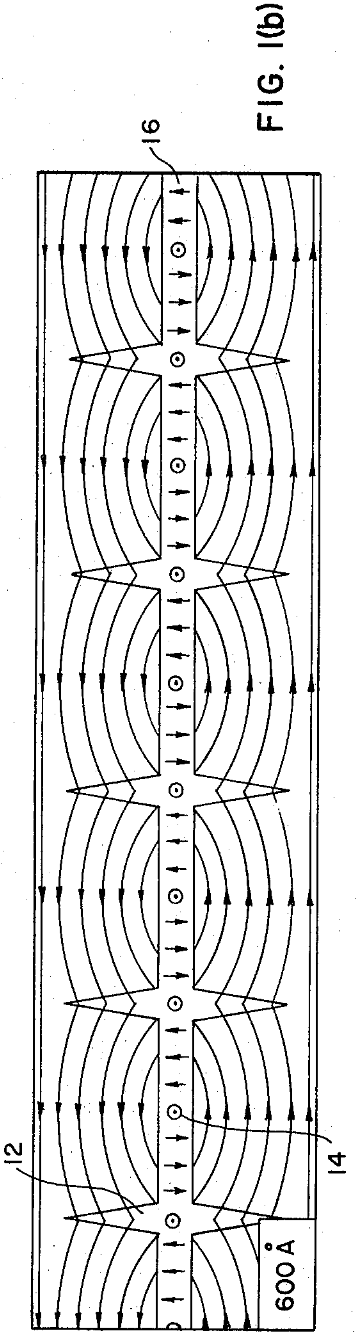
Figure 1C:
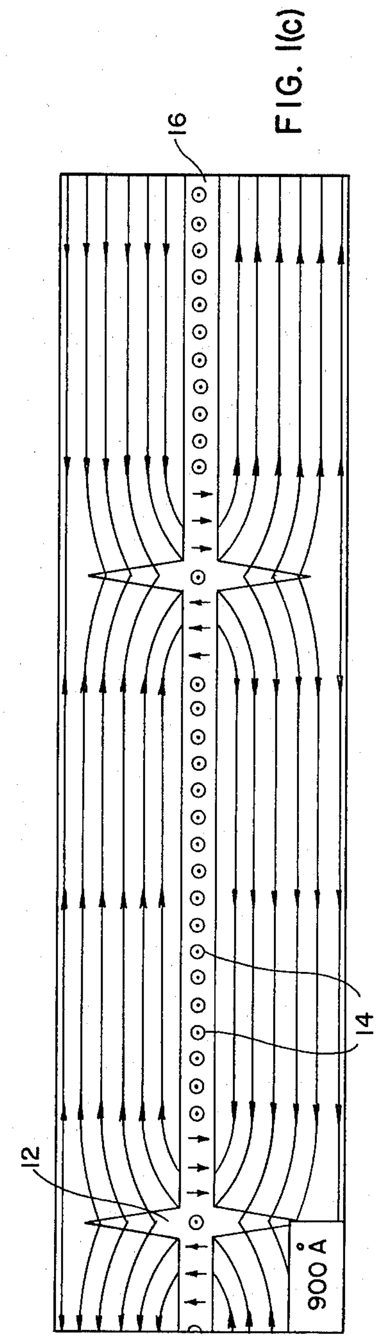

A wall is a boundary between domains in which the magnetization is in different directions. Walls have widths which range from about 200 A to 20,000 A depending on the type, material, and thickness. There are three types of walls that occur in thin magnetic films. One is the Bloch wall, which is found in bulk materials of 1,000 A thickness or more. A second is the unipolar Neel wall, which is found in very thin films such as 100 A thick. A third type of wall is a cross-tie wall. The cross-tie wall is an intermediate wall appearing in materials of approximately 600 A thick which has sections of Neel walls bounded on one side by a Bloch line and the other side by a cross-tie. Referring now to FIG. 1, the three types of walls are illustrated on thin film 18, wherein the vectors within the wall show the direction of magnetization in the middle of the wall. FIG. 1 *a* shows a long section of unipolar Neel wall 11 and a short section 10 in which the polarity is reversed. The short section is bounded by a cross-tie 12 and a Bloch line 14. The Bloch line 14 resembles a short section of Bloch wall which is the predominate wall in FIG. 1 *c*. In FIG. 1 *b* a periodic cross-tie wall is shown. The type of wall that occurs depends on the thickness of the film, with Bloch walls occuring in films of a thickness of approximately 1,000 A, Neel walls in films approximately 300 A and cross-tie walls occurring in films on the order of 600 A. The walls shown in FIG. 1 conform to what occurs in 80–20 Ni-Fe thin films, although other materials have suitable magnetic properties as memory devices.

The "one" or "zero" of computer language is represented by the reversed polarity sections 10 which occurs in 300 A film as shown in FIG. 1 *a*. These inversions of the Neel wall can be seen magneto-optically or using a Bitter solution which is a suspension of fine magnetic particles attracted to the wall. It is clear from FIG. 1 that much of the flux closes on itself around the Bloch line 14 indicating a circulation, or curl. In general, a circulation in a uniform field gives rise to a force. For example, the flux about a current carrying wire in a uniform field given rise to a force on the wire and it moves normal to the direction of the uniform field and the wire's length. When a uniform field is applied to the film 18 of FIG. 1, the Bloch line 14 will move to the left. It takes approximately 0.3 oe field to move the Bloch line 14 down the wall. The cross-tie 12 does not move except at much larger fields and only under special conditions to be detailed hereinafter. The Bloch line 14 will move along the wall until it meets another cross-tie 12 and stop near it. If additional field is applied, the Bloch line 14 and cross-tie 12 will annihilate each other and a unipolar Neel wall 11 results (annihilation). It is therefore seen that the Bloch line 14 is analogous to a twist in a ribbon and if free to propagate just as a twist in a stretched ribbon.

The serial access memory according to this invention works like a large shift register and is analogous to a tape recorder except that no moving parts are required. Instead of moving a tape, the data moves along a medium. This requires an input, an output and some method of stepping the digital data along. The medium must be capable of storing all "zeros" or all "ones" and any combination thereof. The propagation technique cannot introduce or lose "ones" and "zeros." A film thickness of between 300 A and 400 A is chosen since it can support all ones (periodic cross-tie wall, FIG. 1(*b*), or all zeros, unipolar Neel wall, FIG. 1(*a*)). This film thickness has been found to enable propagation without spontaneous nucleation, enabling Bloch lines 14 to be moved without generating "ones" (nucleating reversed Neel walls).

Figure 2:
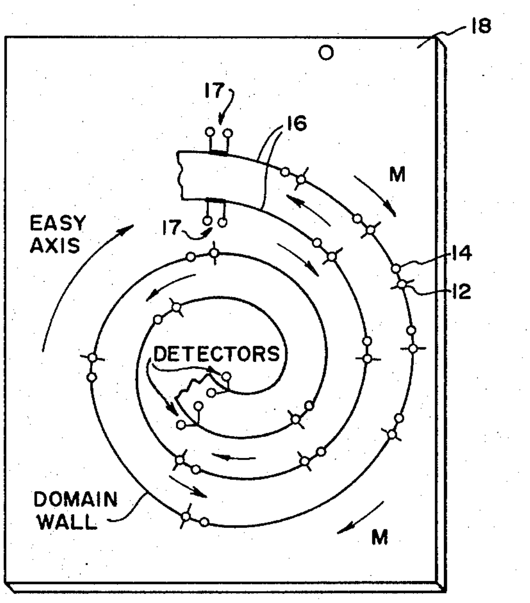
FIG. 2 illustrates a schematic view of domain walls on a film with a circumferential easy axis.

Referring now to FIG. 2 there is shown domain walls 16 on a film 18 with a circumferential easy direction of magnetization. The domain walls 16 can be placed on the film by placing a circuit board (not shown), on which a spiral conducting path is etched, over the film 18. First the film 18 is deposited near a resistive disk (not shown) through which radial current is passed during deposition. Then a current large enough to produce a field $H_k$ is applied through the spiral conductor. Simultaneously, a small field $H_c$ is applied circumferentially opposite the original direction of magnetization along the easy axis. The magnetization near the conductor will rotate to approximately the vector sum of the applied fields and when the current is removed, it relaxes to the easy axis to form the pattern shown in FIG. 2. The spacing between walls is approximately 25 micrometers or less. The wall 16 can be kept in position by placing conductors on both sides of the wall with current through them. After creating the walls 16, the digital information is read into the memory film 18 by placing a fine wires 17 above the domain wall 16 and applying a pulse of proper polarity to invert the Neel wall to form to Bloch lines 14 and cross ties 12.

Figure 3A:
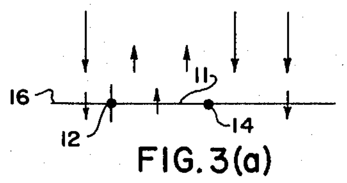
FIGS. 3 *a*, 3 *b* and 3 *c* illustrate the field patterns applied to the domain wall and how they propagate the Bloch lines and cross-ties.
Figure 3B:
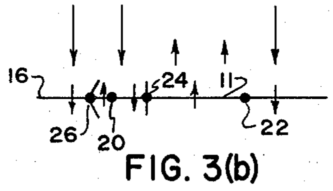
Figure 3C:
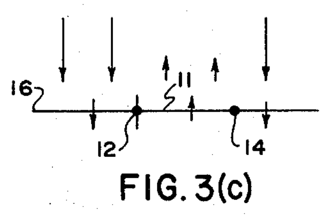

Referring now to FIG. 3 there is shown a method of propagating the digital information represented by the cross-ties 12, Bloch lines 14 and Neel walls. The field required at the wall 16 is represented by the vectors. The small vectors represent fields sufficiently large to propagate the Bloch line 14 but not large enough to nucleate to spurious "ones." FIG. 3(*a*) shows the field at the wall at time $t_o$. At time $t_o + \Delta t$, the field is modified to form a new vector field pattern, creating new Bloch line 20 and 22 and cross-tie 24 between them, thereby stretching the old inversion and nucleating a new inversion within the old inversion. As shown in FIG. 3(*b*) old cross-tie 26 is annihilated by new Bloch line 20 as shown in FIG. 3(*c*), removing them both, with the effect that the "one," defined by inverted Neel section 11, moves by relocating the cross-tie.

Figure 4:
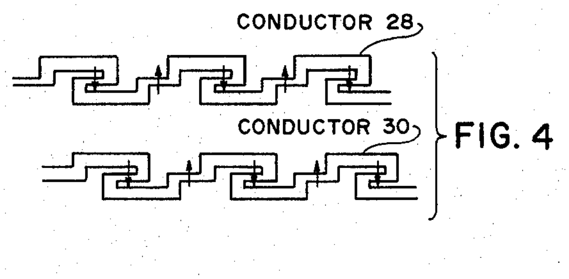
FIG. 4 illustrates the conductors and their relationship to each other that produce the field patterns of FIG. 3.
Figure 5A:
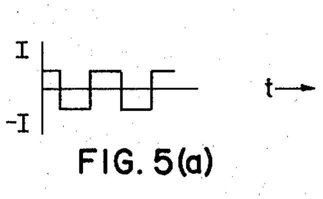
FIGS. 5 *a* and 5 *b* illustrate the currents applied to the conductors of FIG. 4 to produce the required field patterns.
Figure 5B:
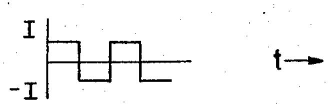

Referring to FIG. 4, there is shown apparatus for obtaining the localized field pattern shown in FIG. 3. Conductor 30 is placed above conductor 28 but displaced as shown. FIG. 5(*a*) shows the current as a function of time applied to conductor 28 and FIG. 5(*b*) shows the current as a function of the time applied to conductor 30. These currents produce the localized fields which add or subtract from the uniform static field (not shown) resulting in the propagation fields as shown in FIG. 3. Obviously many other configurations are possible to propagate the Bloch line and cross-tie along the domain wall. One possible method is to place conducting wires above the film. Current through the wire is sufficient to produce flux which can be propagated. An alternative method of propagation is to treat the Bloch line as a "one," the cross-tie as a "one" and their absence of a "zero," and separating them from each other as far as desired. Each can be thought of as a separate bit and propagated as such with the inverted Neel wall neglected except for readout purposes.

Figure 6:
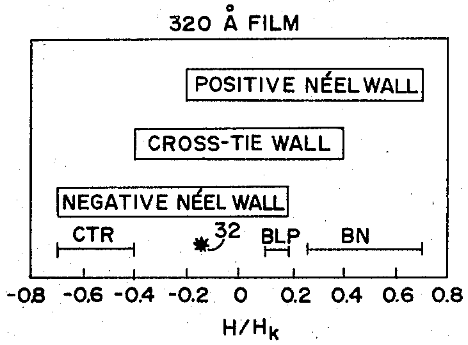
FIG. 6 is a chart illustrating the necessary field pattern required for nucleation and propagation.

The amplitude of the fields H applied along the hard direction represented by vectors in FIG. 3 are shown in FIG. 6 as they relate to the stability conditions of the walls. For example, in a normal 320 A film with $H_k =$ 3 oe, a field of +0.36 oe is sufficient to move the Bloch line but not large enough to nucleate the unwanted "one." At the generator where the "ones" are introduced (bit nucleation) a field of 1.5 oe is required to generate a "one." To relocate a cross-tie a field of −1.7 oe is required. The Bloch line propagation (BLP) field and cross-tie relocation (CTR) field relate to the long and short vectors of FIG. 3. It has been found that to obtain the fields for propagation, it is convenient to apply a bias field of −0.16 $H_k$ to simplify propagation as shown by the asterisk 32 midway between the CTR and BLP fields. Then by superposition of the bias field and the fields generated by conductors 28 and 30 shown in FIG. 4, the propagation fields of FIG. 3 are attained. It is seen that at zero applied field, the cross-tie and Neel walls are stable (all "ones," all "zeros," or any combination). The Bloch line propagation field is applied in the stability region where no loss or generation of spurious data can occur. Only the negative Neel wall is stable where the cross-tie relocation field is applied. Only the positive Neel wall is stable where the bit nucleation (BN) field is applied.

Thus it is apparent that there is provided by this invention a cross-tie memory capable of speeds 100 to 1,000 times/faster than bubble devices thereby reducing costs. The speed can be much greater, up to 125 megabits/sec since no wall motion is involved in the cross-tie memory as in bubbles. Inasmuch as no large permanent biasing magnets are required, the packaging is easier, cheaper and the size smaller than the bubble memory. This feature is especially important where indefinite storage or storage of about $10^{12}$ bits is required. Practical density for cross-ties is about 1 million bits/in$^2$ as limited by optical photolithography, though it can be increased by a factor of 70 for higher anisotropy materials. If electron beams are used to obtain the propagation pattern it might be possible to store about 1 billion bits/in$^2$. The energy required when using photoetched conductors is about $10^{-}16$ watt-sec to step one bit one location. A $10^8$ bit memory running at 100 megabits/-sec will consume about 1 watt, comparing very favorably with bubbles. Rather than store information in domains as done with bubbles, the information is stored in the domain walls. Walls are much smaller than domains, so whatever can be accomplished with domains can be accomplished smaller with walls.

It is to be understood that what has been described is merely illustrative of the principles of the invention and that numerous other arrangements in accordance with this invention may be devised by one skilled in the art without departing from the spirit and scope thereof.

What is claimed as new and desired to be secured by Letters Patent of the United States is:

1. A magnetic propagation arrangement comprising:

a stationary domain wall containing Bloch lines, cross-ties, and Neel walls wherein digital information is stored in said Neel walls;

means external to said domain wall for creating a field pattern on said domain wall whereby said digital information is propagated along said domain wall.

2. A magnetic propagation arrangement as recited in claim 1 wherein said domain wall is formed on a thin film material.

3. A magnetic propagation arrangement as recited in claim 2 wherein said thin film is 80-20 Ni-Fe composition and approximately 320A thick.

4. A magnetic propagation arrangement as recited in claim 1 wherein said means external to said wall comprises variable current carrying conductors creating fields sufficient enough to move said Bloch line and relocate said cross-tie through annihilation.

5. A magnetic propagation arrangement as recited in claim 4 wherein digital "one" is contained in inverted Neel wall segments.

6. A magnetic propagation arrangement as recited in claim 5 further including means for serially inserting said digital information into said domain wall.

* * * * *